June 15, 1954 — M. E. REYNOLDS — 2,681,211
FOOD MIXER
Filed Jan. 19, 1953 — 2 Sheets-Sheet 1

MARGUERETTE E. REYNOLDS
INVENTOR

HUEBNER, BEEHLER,
WORREL & HERZIG
ATTORNEYS

BY Richard M. Worrel

June 15, 1954 M. E. REYNOLDS 2,681,211
FOOD MIXER

Filed Jan. 19, 1953 2 Sheets-Sheet 2

MARGUERETTE E. REYNOLDS
INVENTOR

HUEBNER, BEEHLER,
WORREL & HERZIG
ATTORNEYS

Patented June 15, 1954

2,681,211

UNITED STATES PATENT OFFICE 2,681,211

FOOD MIXER

Marguerette E. Reynolds, Santa Barbara, Calif.

Application January 19, 1953, Serial No. 331,900

9 Claims. (Cl. 259—119)

The present invention relates to food mixers and more particularly to an apparatus for concurrently beating, mixing, whipping or stirring food materials while heating the same.

Many recipes call for the beating, mixing, whipping, stirring or other agitation of food materials while they are being cooked and perhaps many more recipes would do so if such concurrent operations were not so difficult to perform.

While electrically motivated food mixers have long been known, they make no provision for the heating of materials agitated thereby. It thus is the usual practice in preparing foods which should be concurrently cooked and agitated, to heat the foods and then transfer them to a conventional kitchen mixer for subsequent agitation. Such transfer causes a substantial heat loss, and the full advantages of concurrent cooking and agitating are not attained. Some housewives have followed the practice of manually supporting their kitchen mixers over utensils containing food materials being cooked so that the concurrent operations can be effected. This is such a laborious and uncomfortable task while exposed to the cooking heat that it is performed only in rare instances and on those occasions usually much spilling and splashing of the food materials.

An object of the present invention is to enable the housewife conveniently and easily to beat, mix, stir, whip or otherwise agitate materials while they are being cooked.

Another object is to provide convenient means for holding a kitchen mixer over a container being heated with beaters of the mixer disposed within the container.

Another object is to provide an automatic apparatus for beating, mixing, stirring, whipping, or otherwise agitating food materials concurrently with their cooking.

Another object is to provide a combined container for holding food materials while being cooked, a lid mounted on the container to preclude splashing of food materials therefrom, and a mixer mounted on the lid with the beaters of the mixer disposed within the container.

Another object is to provide a cooking utensil adapted to receive a mixer in rested position thereon with beaters of the mixer disposed within the utensil.

Further objects are to provide improved elements and arrangements thereof in an apparatus of the character and for the purposes set forth.

Still further objects and advantages will become apparent in the subsequent description in the specification.

Figure 1:
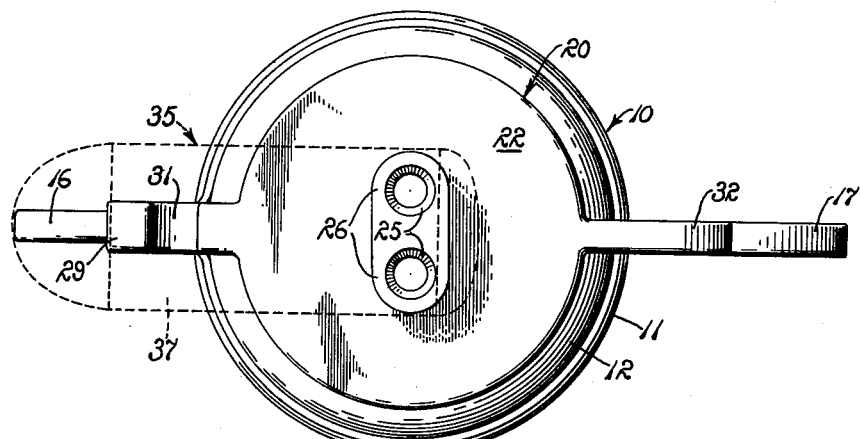
Fig. 1 is a plan view of a utensil embodying the principles of the present invention showing, in dashed lines superimposed thereon, the outline of a mixer rested on the utensil and operable therein.
Figure 2:
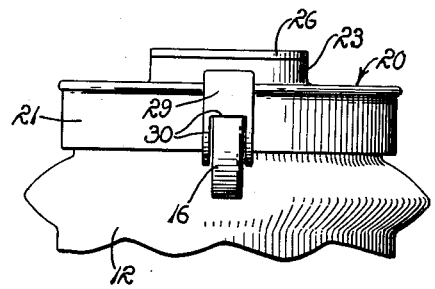
Fig. 2 is a fragmentary side elevation of the utensil shown in Fig. 1.
Figure 3:
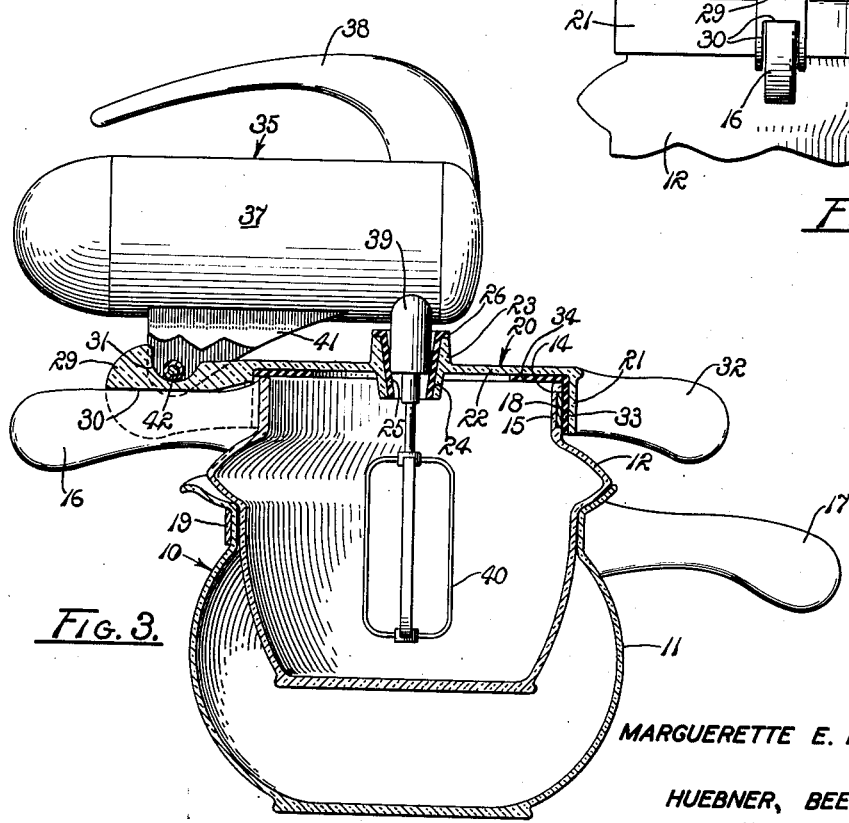
Fig. 3 is a vertical section of a container in the form of a double boiler for food material to be concurrently cooked and mixed, a lid embodying the principles of the present invention mounted on the container, and a mixer, shown in elevation, gravitationally rested in operable position on the lid.
Figure 4:
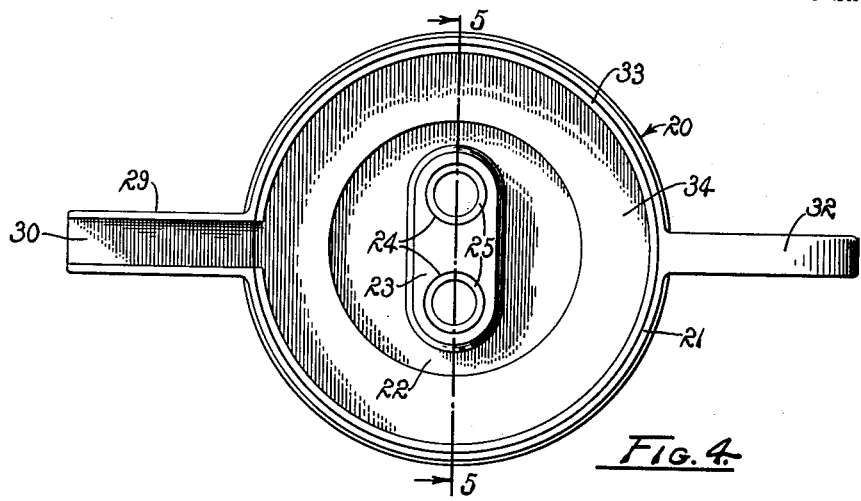
Fig. 4 is a bottom view of the lid shown in Fig. 3.

Referring in greater detail to the drawings:

A double boiler is indicated generally at 10 in Figs. 1 and 3 including a boiler 11 and a food container 12 nested in the boiler. While food materials, not shown, which are to be concurrently heated and agitated are conveniently heated in the double boiler, it is to be understood that the present invention is not limited to such a utensil. The container 12 may be rested directly on a stove, hot plate, or otherwise heated as desired without departing from the spirit of the present invention.

The container 12 has a substantially circular upwardly disposed opening 14 circumscribed by a substantially cylindrical rim 15. A handle 16, of substantially uniformed width throughout its length, is horizontally extended radially from the rim 15. For purposes of convenience, a handle 17 is provided on the boiler member 11. The handles 16 and 17 are conveniently mounted on the food container 12 and boiler 11 by circumscribing bands 18 and 19 respectively, in the well known manner. For purposes of balance, the handle 17 is preferably heavier than the handle 16 and is oppositely extended when the boiler 11 and container 12 are assembled for use as a double boiler.

Figure 5:
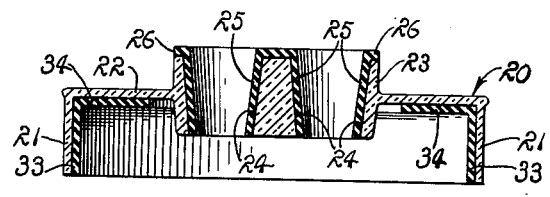
Fig. 5 is a section taken on line 5—5 of Fig. 4.
Figure 6:
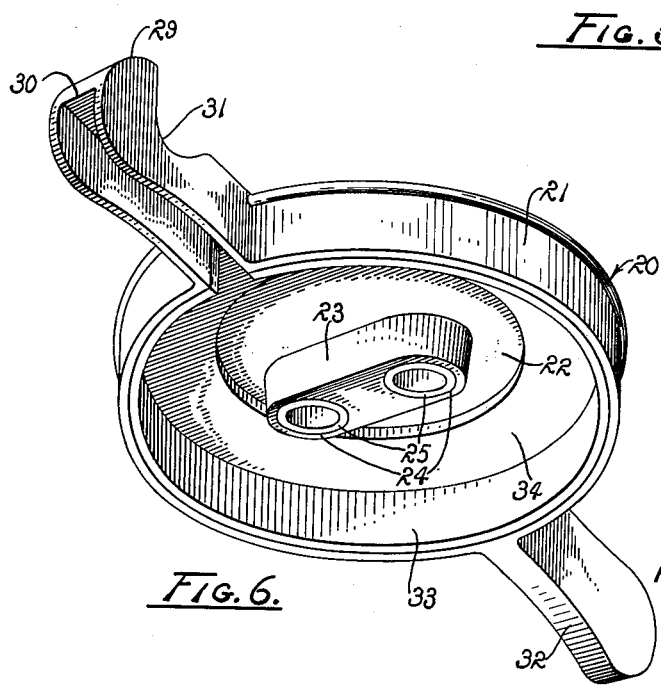
Fig. 6 is a lower prospective view of the lid.

An inverted cup-shaped lid 20 is fitted downwardly over the rim 15 in covering relation to the opening 14. The lid provides a substantially cylindrical skirt 21 having an upper end closed by a substantially circular plate 22 integral with the skirt. The skirt has an opening therethrough radially of the plate to receive the handle 16 of the container 12. A thickened portion, or island, 23 is provided centrally of the plate 22 and a pair of frusto-conical bores 24 are provided in the island 23 in spaced relation diametrically of the plate. The bores have smaller open ends downwardly disposed from the plate and larger open ends upwardly disposed from the plate, as best shown in Figs. 3 and 5. Frusto-conical sleeves 25 of resiliently compressible material such as rubber, plastic, or the like are mounted in the bores and are upwardly extended from the thickened portion of the plate a distance sufficient to permit shoulders 26 radially extended therefrom to rest on the upper surface of the plate.

A holding arm 29 is radially extended from the skirt 21 and has a downwardly disposed channel 30 longitudinally aligned with the opening in the skirt 21 fitted downwardly over the handle 16. The holding arm thus embraces the sides of the handle so as dependably to hold the lid in position on the rim 15 of the container 12. An upwardly disposed groove 31 is formed transversely of the holding arm 29 in substantially parallel relation to the diametrical spacing of the bores 24, for purposes soon to be described. A container handle 32, is rigidly extended from the skirt 21 diametrically oppositely to the holding arm 29. The skirt 21, plate 22, holding arm 29, and container handle 32 are preferably of unitary construction and may be cast, pressed, fabricated or otherwise formed from metal, plastic, glass, or other suitable material.

A substantially cylindrical gasket 33 of resilient heat resistant material is mounted inwardly against the skirt 21 and provides a releasable seal between the rim and skirt. A substantially flat annular gasket 34, integral with the gasket 33, is mounted against the lower surface of the plate 22 and provides a releasable seal between the rim 15 and the plate. Not only do the gaskets perform their sealing functions but they likewise deaden noise of a mixer 35 rested on the lid, to which reference is now made.

The mixer 35 is of well known form and provides a motor housing 37 enclosing an electric motor, not shown. A handle 38 is provided on the housing for lifting and positioning convenience. A pair of stub sleeves 39 are downwardly extended from the housing and releasably mount beaters 40 therein in driving connection to the motor. It will be noted that the centers of the bores 24 are spaced a distance substantially equal to the spacing of the centers of the sleeves 39 and beaters 40. A bracket 41 is downwardly extended from the housing and mounts a substantially horizontal pintle 42 therein. The mixer shown in the drawing is conventionally held on a mixing stand, not shown, by engagement of the pintle 42 therewith and is pivotal between operable and inoperable position on the pintle as well as disengageable from the stand by lifting the pintle therefrom.

One end of the mixer 35 is rested on the lid 20 with the stub sleeves 39 extended downwardly into the frusto-conical sleeves 25 and gravitationally held in sealing relation therewith. The pintle 42 is gravitationally rested in the groove 31.

*Operation*

The operation and utility of the present invention are believed to be clearly apparent and are briefly summarized at this point. Food material, not shown, which it is desired to beat, mix, stir, whip, or otherwise agitate is placed in the container 12. The container is assembled in the boiler 11 or otherwise arranged for heating purposes. When the boiler is utilized, water is first provided therein and the container seated in the boiler. The resultant double boiler is then placed on a stove, hotplate or other heating means.

The mixer 35 is removed from its conventional stand, and the beaters 40 withdrawn from the stub sleeves 39, in the well known manner. For convenience, the mixer is usually held in an inverted position to rest the lid 20, also in an inverted position, thereon with the pintle 42 received in the groove 31 and the frusto-conical sleeves 25 rested downwardly on the stub sleeves 39. The beaters 40 are then re-engaged in their respective stub sleeves for operation.

With the mixer 35 and lid 20 associated in the manner described, they are returned to upright position, as shown in Fig. 3, and the lid lowered on the rim 15 of the container 12 with the channel 30 of the holding arm 29 fitted downwardly over the handle 16 of the container. The weight of the forward end of the mixer 35 supported on the stub sleeves 39 engaged with the frusto-conical sleeves 25 effectively seals the frusto-conical bores 24 against leakage during operation. The weight of the mixer 35 supported on the pintle 42 dependably holds the arm 29 on the handle 16 so that the lid 20 cannot rotate on the container 12 incident to any torsional forces developed by mixer operation. The weight of the mixer and lid is supported on the rim 15 of the container and serves to hold the annular gasket 34 under sealing compression. The seal thus attained is augmented by the sealing effect of the cylindrical gasket 33 between the rim 15 and the skirt 21.

So assembled, any food disposed within the container 12 is heated, as desired, and the mixer energized in the well known manner to agitate the food. The dependable association of the mixer 35 and lid 20 is such that no attention need be devoted to the apparatus during operation. The mixer operation and the heating may continue without attention for any required period. It will be noted, that there is no opening through which the beaters 40 may throw food material.

Subsequent to operation, the lid 20 and mixer 35 are conveniently lifted from the container by grasping the arm 29 and the handle 32. The lid and mixer are readily disassociated by first removing the beaters 40 in a procedure the reverse of that described for their association.

The present invention has enabled the convenient and easy beating, mixing, stirring, or whipping of food materials while such materials are cooked. While the lid 20 is described in terms of having a mixer 35 utilized therewith, it will be apparent that a shearing, comminuting, or liquifying apparatus may be substituted for the mixer if it is desired to accomplish such operations while beating food material in the container. The device is economical to produce, convenient and easy to use, readily cleaned after use, and thoroughly effective in accomplishing its intended purposes.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. The combination of a container having an upwardly disposed opening and a handle integrally secured thereto and extending outwardly from the container adjacent to the opening for manual manipulation of the container; a lid having an inverted substantially cup-shaped body fitted downwardly over the opening of the container and having bore means therethrough, an arm substantially horizontally extended from the body provided with a downwardly disposed channel fitted downwardly over the handle of the container, and a handle oppositely extended from the body relative to the arm for manual manipulation of the cover; and a mixer having a housing rested on both the arm and the body of the lid and having beater means extended downwardly through the bore means of the lid into the container.

2. A cooking utensil lid comprising a substantially circular plate having a pair of frusto-conical bores therethrough diametrically spaced therein, the bores having smaller open ends at a common side of the plate and larger open ends at the opposite side of the plate, frusto-conical sleeves of resiliently compressible material mounted in the bores, a substantially cylindrical skirt connected to the periphery of the plate and axially extended from the side of the plate having the smaller open ends of the bore, a holding arm radially extended from the skirt having a longitudinal channel opening in the direction of extension of the skirt from the plate and adapted to fit over the handle of a cooking utensil, and a handle for manipulating the lid extended diametrically oppositely to the skirt from the arm.

3. The combination of a container adapted to be heated having an upwardly disposed opening circumscribed by a rim, and a handle substantially horizontally extended from the rim; a lid having an inverted substantially cup-shaped body fitted downwardly over the rim in closing relation to the opening of the container and providing a frusto-conical bore therethrough having upwardly divergent sides, said lid also having a holding arm outwardly extended therefrom provided with a longitudinal downwardly disposed channel coextensive with the length of the holding arm and fitted over the handle of the container, and a frusto-conical sleeve of resiliently compressible material mounted within the bore; and a mixer having a housing rested on the holding arm and on the sleeves, and a beater downwardly extended through the bore and sleeve into the container.

4. A cooking utensil lid comprising a substantially cylindrical skirt, a substantially circular plate integral with the skirt and in closing relation to an axial end thereof, the plate having a thickened central portion providing a pair of frusto-conical bores therethrough spaced diametrically of the plate having smaller open ends disposed therefrom, a pair of frusto-conical sleeves of resilient material mounted within the bores of the plate, a substantially cylindrical gasket mounted within the skirt, a substantially flat annular gasket integral with the cylindrical gasket mounted against the plate, a holding arm radially extended from the skirt having a longitudinal channel opening toward the smaller open ends of the bores adapted to fit over a cooking utensil handle and an upwardly disposed transverse groove in substantially parallel relation to the diametric spacing of the bores, and a handle radially extended from the skirt diametrically opposite to the arm.

5. The combination of a container having an upwardly disposed substantially circular opening circumscribed by a rim and a handle of substantially uniform width throughout its length radially extended from the rim; a lid fitted downwardly over the opening of the container having a central thickened portion providing a pair of spaced frusto-conical bores therethrough, frusto-conical sleeves of resilient material mounted in the bores and upwardly extended therefrom, and an arm substantially radially extended from the lid having a channel therein fitted downwardly over the handle of the container and an upwardly disposed groove transversely thereof; and a mixer having a motor housing rested on the sleeves, a mounting pintle connected to the housing rested in the transverse groove of the lid arm, and a pair of beaters downwardly extended through the sleeves into the container.

6. A kitchen utensil for use with a kitchen mixer having a pair of downwardly disposed beaters and a substantially horizontal mounting pintle comprising a container adapted to receive material to be agitated and heated having an upwardly disposed substantially circular opening circumscribed by a rim and a radially extended handle of substantially uniform width throughout its length, a substantially cylindrical skirt having a lower end fitted downwardly over the rim of the container and an upper end, the skirt having an opening through which the container handle is extended, a circular plate integral with the skirt closing the upper end thereof, said plate having a central thickened portion providing a pair of spaced frusto-conical bores therethrough spaced to receive the beaters of the kitchen mixer, the bores having upwardly disposed enlarged ends, frusto-conical sleeves of resiliently compressible material mounted in the bores and having upper ends extended above the plate, a substantially cylindrical gasket mounted within the skirt in engagement with the container, the container handle being extended through the gasket, a substantially flat annular gasket integral with the cylindrical gasket mounted against the plate, a holding arm integral with the skirt and plate radially extended from the skirt at the opening therein, said arm having a downwardly disposed channel adapted to fit downwardly over the handle of the container so as to embrace opposite sides thereof and an upwardly disposed groove transversely of the handle adapted to receive the mounting pintle of a mixer in rested position therein with the beaters downwardly extended through the sleeves and with the mixer also rested on the sleeves.

7. A lid, adapted to support a power driven mixer having a pair of downwardly disposed beaters and a horizontal mounting pintle in spaced relation to the beaters on a heated container having an upwardly disposed opening defined by a circular rim and a handle radially extended from the rim of substantially uniform width, comprising a substantially cylindrical downwardly extended skirt adapted to fit downwardly over the container rim having an opening for extension of the container handle therethrough, a circular plate integral with the skirt in closing relation to the upper end thereof, said plate having a central thickened portion having a pair of spaced frusto-conical bores therethrough spaced to receive the beaters of the mixer, the bores having upwardly disposed enlarged open ends, frusto-conical sleeves of resiliently compressible material mounted in the bores and having upper ends extended above the plate, a substantially cylindrical gasket mounted against the inwardly disposed surface of the skirt for container engagement providing a handle opening in registry with the opening in the skirt, a substantially flat annular gasket integral with the cylindrical gasket mounted against the plate adjacent to the skirt, a holding arm integral with the skirt and plate radially extended from the skirt at the opening therein, said arm having a downwardly disposed groove adapted to fit downwardly over the handle of the container so as to embrace opposite sides thereof and an upwardly disposed transverse groove adapted to receive the mounting pintle of the mixer in rested position therein with the mixer also rested on the frusto-conical sleeves with the beaters extended downwardly through the sleeves into the container, and a handle integral with the skirt, plate, and arm radially extended from the skirt diametrically opposite to the arm.

8. The combination of a container having an upwardly disposed opening circumscribed by a rim and having a handle radially extended from the rim; a lid fitted downwardly over the opening of the container and having a central thickened portion providing a frusto-conical bore therethrough, a frusto-conical sleeve of resilient material mounted in the bore and upwardly extended therefrom, and an arm substantially radially extended from the lid having a channel therein fitted downwardly over the handle of the container and having an upwardly disposed groove transversely thereof; and a mixer having a housing rested on the sleeve, a mounting pintle connected to the housing rested in the transverse groove of the lid arm, and a beater downwardly extended through the sleeve into the container.

9. The combination of a mixing container removably rested within another container for heating the contents of the mixing container during the mixing operation, said mixing container having an upwardly disposed opening circumscribed by a rim and having a handle radially extended from the rim; a lid fitted downwardly over the opening of the container and having a central thickened portion providing a frusto-conical bore therethrough, a frusto-conical sleeve of resilient material mounted in the bore and upwardly extended therefrom, and an arm substantially radially extended from the lid having a channel therein fitted downwardly over the handle of the container and having an upwardly disposed groove transversely thereof; and a mixer having a housing rested on the sleeve, a mounting pintle connected to the housing rested in the transverse groove of the lid arm, and a beater downwardly extended through the sleeve into the container.

References Cited in the file of this patent
UNITED STATES PATENTS

| Number | Name | Date |
|---|---|---|
| 430,783 | Mulford | June 24, 1890 |
| 2,043,045 | Krinard | June 2, 1936 |
| 2,321,453 | Borleau | June 8, 1943 |
| 2,352,232 | Strauss | June 27, 1944 |
| 2,517,648 | Franke | Aug. 8, 1950 |
| 2,522,372 | Jepson | Sept. 12, 1950 |
| 2,538,583 | Morrison | Jan. 16, 1951 |
| 2,557,622 | Trier | June 19, 1951 |